Dec. 18, 1962  A. L. MORLIK  3,069,180
SEAL CONSTRUCTION
Filed Feb. 16, 1959

INVENTOR.
Andrew L. Morlik
BY
Learman, Learman & McCulloch
ATTORNEYS 3,069,180
SEAL CONSTRUCTION
Andrew L. Morlik, Saginaw, Mich., assignor to Saginaw Products Corporation, Saginaw, Mich., a corporation of Michigan
Filed Feb. 16, 1959, Ser. No. 793,594
3 Claims. (Cl. 277—174)

This invention relates to seal constructions and more particularly to a seal adapted to be interposed between two telescoping members to prevent the entry of foreign matter therebetween and to prevent the loss of lubricant from between the telescoping parts.

The use of seals of the kind referred to is quite common where the entry of foreign matter and/or the loss of lubricating fluid from between inner and outer telescoping members is desired to be prevented and no particular difficulty is encountered with known types of seals as long as the telescoping members are substantially uniform throughout their length. Uniformity of such members is reasonably easy to obtain on machined parts such as cylinders turned on lathes, but uniformity of a single element from end to end is not such a simple matter if the element is formed by an extrusion or other process and if it has a cross-sectional configuration other than circular. Not only is it more difficult and quite expensive to form such elements to close tolerances, but it also is quite difficult to rework a non-uniform element of non-circular cross-section to overcome whatever defects may be present. For example, a pair of telescoping, tubular, non-circular cross-section members may be placed one within another and, due to differences in wall thickness or other reasons, the spacing between the adjacent wall portions of the two members may vary considerably from end to end of the members.

Sealing devices of the kind in use heretofore with telescoping and like members ordinarily have been constituted by some sort of suitable packing material occupying the space between the two telescoping parts and being somewhat larger than the space so as to be somewhat under compression. Such devices are satisfactory for use with telescoping members which are substantially uniform from end to end inasmuch as the space between the members then will be substantially uniform, but they are not entirely suitable for use in those instances where the spacing between the telescoping members varies because of non-uniformity of the members themselves. Assume, for example, that the spacing between two telescoping members increases as one member is with-drawn from the other. A conventional seal arranged to seal the space when the two members are retracted may be incapable of sealing the space when the members are withdrawn because of the increase in the spacing between the members. On the other hand, should the spacing between the two members decrease upon relative movement of the members, a seal which is of such size as to seal the space when it is the greatest will offer interference to the relative movement of the two members as the spacing therebetween decreases.

An object of this invention is to provide a seal construction for use in conjunction with relatively movable telescoping members and which is capable of compensating for considerable differences in the spacing between the two telescoping parts.

Another object of the invention is to provide a sealing construction of the kind referred to which will not interfere with relative movement of the telescoping parts.

A further object of the invention is to provide a seal construction for relatively telescoping parts which is simple to install on the parts irrespective of their relative positions of adjustment.

Still a further object of the invention is to provide a seal construction which is rugged and durable in use and which is economical to manufacture.

Other objects and advantages of the invention will be pointed out specifically or will become apparent from the following description when it is considered in conjunction with the appended claims and the accompanying drawing, in which:

Figure 3:
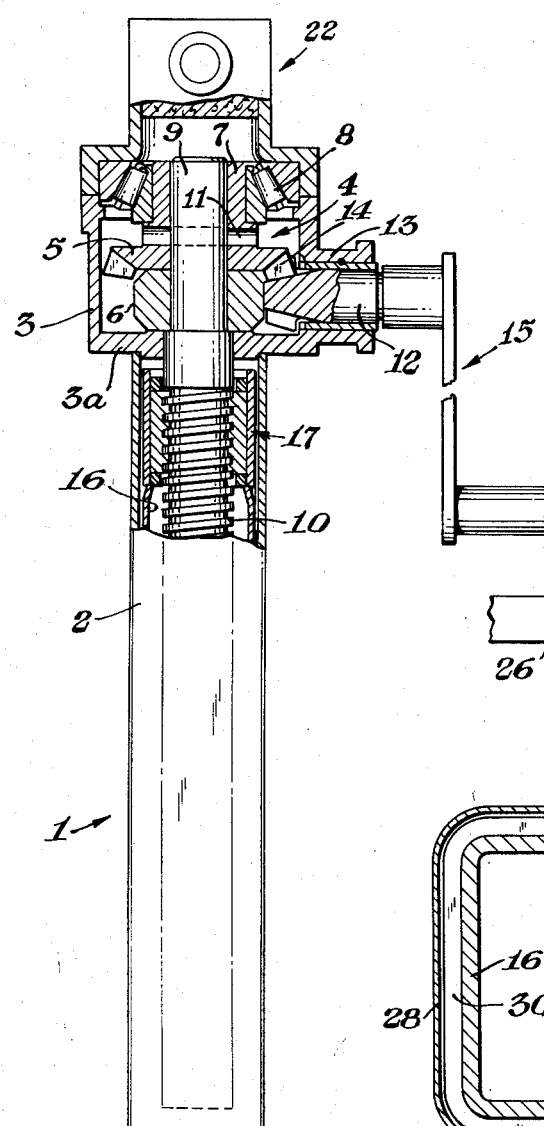
FIGURE 3 is an enlarged, sectional view of a portion of the apparatus shown in FIGURE 1.
Figure 3:
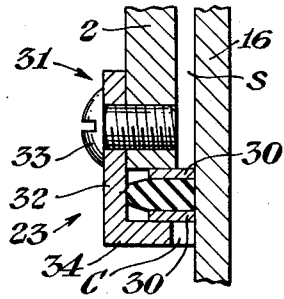
Figure 4:
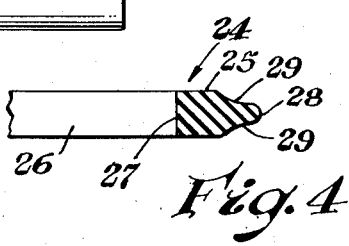
FIGURE 4 is a side elevational view of a sealing element formed in accordance with the invention.
Figure 2:
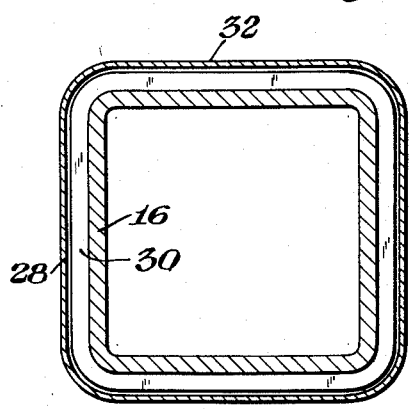
FIGURE 2 is a sectional view taken on the line 2—2 of FIGURE 1.

A typical structure wherein a seal constructed according to the invention would find application is a jack designated generally in the drawing by the reference character 1 and comprising an outer tube or sleeve 2 of quadrangular configuration and rigidly connected at one of its ends to a hollow head 3 in which operating mechanism 4 may be mounted. The operating mechanism may comprise a bevel gear 5 mounted on a bearing support 6 resting on the base of the housing 3 and having an extension 7 rotatably journaled by bearings 8. The parts 3a, 5, 6 and 7 are provided with registering openings through which extends the upper end 9 of a threaded jack screw 10 which may be keyed to the gear 5 by means of a pin 11 extending through the extension 7 and the upper end 9 of the jack screw 10. The arrangement is such that rotation of the gear 5 causes rotation of the jack screw 10.

Means for driving the gear 5 comprises a shaft 12 journaled in an extension 13 formed on the housing 3, the shaft 12 having keyed or otherwise suitably secured to its inner end a bevel pinion 14 in mesh with the teeth of the gear 5. A suitable crank 15 may be fixed to the shaft 12 in any known manner to impart rotation to the pinion 14 and, consequently, to rotate the gear 5 and the jack screw 10.

Figure 1:
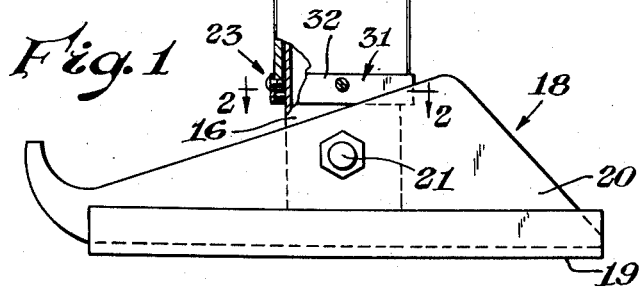
FIGURE 1 is a view partly in elevation and partly in section disclosing a device including a pair of relatively telescoping parts and being equipped with a seal construction formed in accordance with the invention.

Telescopingly mounted within the tubular member 2 and spaced inwardly from the latter is an inner tubular member 16 having a configuration similar to the configuration of the sleeve 2, but being smaller than the latter so as to provide an operating clearance or space S therebetween which preferably is on the order of $\frac{1}{32}$–$\frac{1}{16}$ of an inch. The upper end of the inner sleeve 16 is welded or otherwise rigidly fixed to a nut assembly 17, the threads of which mate with the threads of the jack screw 10. The length of the inner sleeve 16 is such that when it is in its fully retracted position, as is shown in FIGURE 1, the lower end will project beyond the lower end of the outer sleeve 2 a distance sufficient to permit a supporting foot 18 or the like to be mounted thereon. In the disclosed embodiment, the foot 18 comprises a base plate 19 to which is welded a pair of spaced, upstanding frame members 20 which straddle the lower end of the tube 16 and are mounted on the latter by means of a transverse pin 21. The construction and arrangement of the parts described thus far are such that operation of the driving mechanism 4 causes the inner member 16 to move relatively to the outer member 2 and the direction of operation of the mechanism 4 will dictate whether the member 16 is extended or retracted relatively to the member 2.

The housing 3 may be fitted with any kind of suitable bearing structure 22 at its upper end on which apparatus to be supported may rest during operation and use of the jack 1.

The clearance or space S between the walls of the members 2 and 16 may contain a lubricant that would coat the outer surface of the inner tube 16. To avoid the loss of the lubricant and to prevent the introduction of foreign matter to the interior of the outer member 2, the jack may be equipped with a seal designated generally by the reference character 23.

The seal construction includes a seal element 24 shaped to correspond substantially to the shape of the space S and which preferably is formed of any one of a number of known, preferably synthetic, oil resistant, rubber-like materials having a Durometer hardness of about 70. The seal is provided with a central opening 26 of a size and shape corresponding to the size and shape of the outer dimension of the inner telescoping member 16 to provide a body 25 having an inner edge 27 which is adapted snugly to receive the telescoping member 16 over its length. The size of the body part 25 is greater than the size of the space S and preferably the size of the body 25 is such that its outer edge 28 corresponds to the distance between the outer edge of the member 16 and the outer edge of the cylinder 2. In other words, the size of the body 25 preferably corresponds to the wall thickness of the member 2 and to the spacing between the members 2 and 16.

The body of the seal 24 preferably is less thick at one portion that the remainder thereof and, in the preferred construction, both the upper and lower surfaces of the body 25 are cut away along arcuate, converging lines 29 towards the outer edge 28 to provide a tapering outer peripheral edge for the seal 24. The significance of this construction will be pointed out hereinafter.

The seal assembly also preferably includes a pair of scraper rings 30 formed of steel or other suitable material and having a configuration corresponding to the configuration of the inner tube 16 so as to be slidably received thereon over the extensible length of tube 16, the rings 30 being located one above and one below the sealing ring 24. The width of each ring 30 is less than the width of the seal body 25 and, in a preferred construction, the width of this rings 30 corresponds substantially to the width of the thickest portion of the ring body 25.

Means for mounting the seal assembly comprises a substantially cup-shaped retaining member 31 having a mounting flange 32 adapted to be fixed adjacent to the lower end of the outer tube 2 by suitable means such as screws 33. The flange 32 extends below the lower end of the sleeve 2 and is integrally joined to an inwardly directed flange 34 forming a chamber between itself and the lower end of the tube 2 of such size as snugly to receive the seal 24 and the scraper rings 30. Because of the differences which may exist in the wall thicknesses of the telescoping members 2 and 16, the lower flange 34 of the seal retainer 31 should terminate short of the inner telescoping member 16 so as to provide a clearance C therebetween.

When the parts have been assembled in the manner disclosed, the inner edge 27 of the seal 24 and the inner edges of the scraper rings 30 will be in sliding engagement with the outer surface of the inner telescoping member 16 and the outer peripheral edge 28 of the seal 24 will be in abutting engagement with the inner surface of the flange 32 of the seal retainer 31 as is shown in FIGURES 1 and 3. When the member 16 is withdrawn from the member 2, the upper ring 30 and the seal 24 will prevent the escape of any lubricant and, when the member 16 is retracted into the member 2, the lower ring 30 and the seal 24 will scrape the wall of the member 16 to clean the latter and prevent the entry of foreign matter into the cylinder 2.

If, upon relative movement of the members 2 and 16, the space S increases, the seal 24 will be able to compensate for the increase due to the fact that it has a width which is equal not only to the width of the space S, but also to the thickness of the wall of the outer member 2. Thus, even though the members 2 and 16 are not uniform throughout their length, the seal is capable of preventing the escape of lubricant from the member 2 and the entry of foreign matter thereto.

On the other hand, if the space S should decrease in size as the members 2 and 16 are moved relatively to one another, the seal 24 will be compressed between the flange 32 and the wall of the member 16. A seal formed of solid, synthetic rubber, as distinguished from cellular or foam rubber, may be readily deformable, but it is relatively incompressible. Were it not for the construction disclosed, therefore, the seal would interfere with the free movement of the member 16 relatively to the member 2 in a construction wherein the space S decreases. In the disclosed construction, however, the tapering of the outer peripheral edge of the seal 24, coupled with the differences in width of the seal body 25 and the rings 30, provides spaces above and below the ring 24 into which the latter may be deformed in the event it is compressed between the member 16 and the flange 32. Accordingly, the seal construction is enabled to compensate for a decrease in the size of the space or clearance S without adversely affecting operation of the telescoping parts. The seal 24 is not compressed by the retainer ring flange 34 and may be termed a "floating" seal in the sense that it can move laterally in the manner indicated. The rings 30 also "float" in the sense that they are spaced from the retainer ring wall 32 and can shift laterally as the size and shape of the member 16 permits.

While the invention has been disclosed as being adapted for use in conjunction with telescoping members of generally quadrangular configuration, it should be understood that the invention is equally capable of use with telescoping members of any cross sectional configuration. The disclosed embodiment, therefore, is intended to be illustrative of the invention rather than definitive thereof. The invention is defined in the claims.

What is claimed is:

1. In combination, a pair of coaxial, telescoping members one of which is located within and peripherally spaced from the other to provide an adequate extension clearance therebetween; means for relatively telescoping said members; a laterally displaceable, deformable, hard rubber seal having a perimetral configuration corresponding substantially to the perimetral configuration of the clearance between said members and having a size greater than the maximum size of said clearance, mounted in a state substantially free of axial compression snugly around the inner of said members when the clearance between said members is at a maximum; and means mounting said seal on one of said members so that relative axial movement of said members effects relative movement between said seal and the other of said members, said mounting means forming an axial space for said seal corresponding substantially to the greatest thickness of said seal and having a retaining wall portion axially spaced from said clearance, said seal extending beyond said clearance into engagement with said retaining wall portion and having a portion of less thickness, when in an undeformed state, than the said axial space whereby said seal may be deformed at said portion should the clearance between said members decrease during relative axial movement thereof.

2. In combination; a pair of telescopically mounted members, one of which is located within the other, there being a sliding clearance therebetween; means for effecting relative telescoping of said members; a substantially incompressible rubber seal having a perimetral configuration corresponding substantially to the perimetral configuration of the clearance between said members snugly and slideably received on said inner member, retainer ring means for said seal on said outer member engaging the outer perimetral wall of said seal and preventing substantial movement of said seal axially relative to said outer member, said retainer ring means including a side wall secured to said outer member and extending therebeyond to house said seal and a radial flange spaced peripherally from said inner member a distance sufficient to leave said seal substantially free of axial compression and laterally displaceable; said seal having a narrowed, tapering outer edge, and there being adjacent space within the retainer ring permitting deformation thereof; and scraper ring means associated with said seal and retainer ring means so as to be prevented from substantial axial movement relative to said outer member slideably received on said inner member, said scraper ring means being spaced peripherally from said retainer ring side wall.

3. In combination; a pair of telescopically mounted tube members of generally rectangular cross-section, one of which is located within the other, there being a varying sliding clearance therebetween; means for effecting relative telescoping of said members; a hard rubber seal having a generally rectangular configuration corresponding substantially to the generally rectangular configuration of the clearance between said members snugly and slideably received on said inner member when the clearance between said members is maximum, retainer ring means for said seal on said outer member engaging the outer perimetral wall of said seal and preventing substantial movement of said seal axially relative to said outer member, said retainer ring means including a side wall secured to said outer member and extending therebeyond to house said seal and a radial flange spaced peripherally from said inner member a distance sufficient to leave said seal substantially free of axial compression and laterally displaceable; said seal having a narrowed outer edge portion and there being adjacent space within the retainer ring permitting deformation thereof; and scraper ring means associated with said seal and retainer ring means so as to be prevented from substantial axial movement relative to said outer member slideably received on said inner member, said scraper ring means being spaced peripherally from said retainer ring side wall.

References Cited in the file of this patent

UNITED STATES PATENTS

| | | |
|---|---|---|
| 2,282,312 | Halstead | May 12, 1942 |
| 2,599,767 | Long | June 10, 1952 |
| 2,622,449 | Barker | Dec. 23, 1952 |
| 2,930,659 | Wilmore | Mar. 29, 1960 |

FOREIGN PATENTS

| | | |
|---|---|---|
| 132,499 | Australia | May 26, 1949 |